E. T. WARDELL.

TRANSPARENT VACUUM JACKET FOR LIQUID DISPENSING BOTTLES.

APPLICATION FILED NOV. 13, 1917.

Reissued Apr. 1, 1919. 14,629.

Inventor:
Edward T. Wardell
by: T. G. Bradbury
Attorney.

HARRIS PETERS CO., PHOTO-LITHO., WASHINGTON, D.

UNITED STATES PATENT OFFICE.

EDWARD T. WARDELL, OF ST. PAUL, MINNESOTA.

TRANSPARENT VACUUM-JACKET FOR LIQUID-DISPENSING BOTTLES.

14,629. Specification of Reissued Letters Patent. Reissued Apr. 1, 1919.

Original No. 1,161,092, dated November 23, 1915, Serial No. 836,093, filed May 4, 1914. Application for reissue filed November 13, 1917. Serial No. 201,856.

*To all whom it may concern:*

Be it known that I, EDWARD T. WARDELL, a citizen of the United States, residing at St. Paul, in the county of Ramsey and State of Minnesota, have invented certain new and useful Improvements in Transparent Vacuum-Jackets for Liquid-Dispensing Bottles, of which the following is a specification.

My invention has for its object to provide a vacuum jacket for bottles used in connection with liquid dispensing receptacles, wherein said receptacles are supplied with liquid from bottles, containing the liquid.

To the above end my invention comprises the features of construction and combination of parts hereinafter described and claimed.

Figure 2:
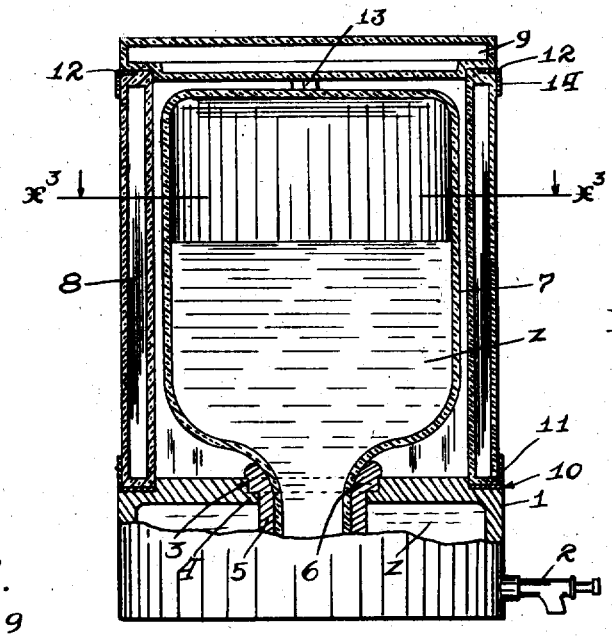
Figure 1:
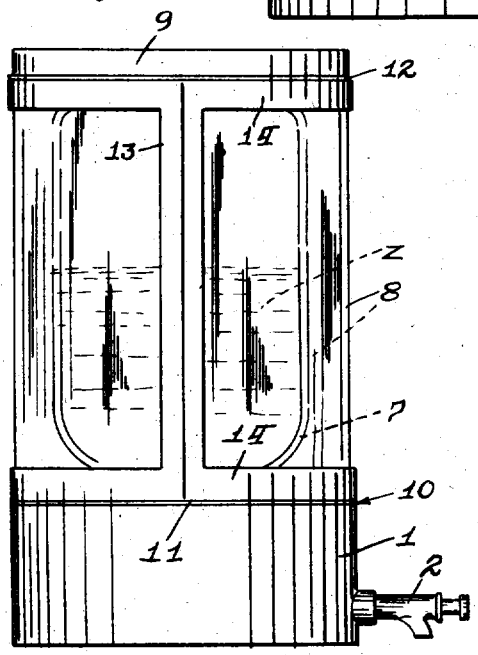
Figure 3:
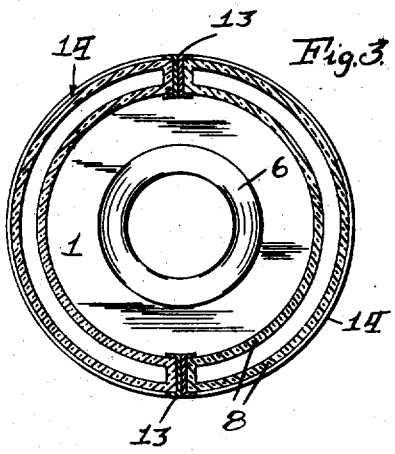

In the accompanying drawing, forming part of this specification, Figure 1 is a side elevation of my invention; Fig. 2 is a view, principally in vertical section, taken centrally through the parts shown in Fig. 1, above the draw-off faucet; and Fig. 3 is a transverse section taken on the line $X^3$ $X^3$ of Fig. 2, with the bottle removed.

The numeral 1 indicates a liquid dispensing base having a draw-off faucet 2. In the top of this receptacle 1 is an annular opening 3, having a stop shoulder 4. Within the opening 3 is mounted an annular cushion 5 having at its upper end a flange 6 which rests on the shoulder 4 and limits the downward movement of the cushion 5 through the opening 3. Water, or other liquids to be dispensed, are delivered to the receptacle 1 from an inverted bottle 7, with its neck inserted through the annular cushion 5, which cushion affords a tight joint around the neck of the bottle and also supports the bottle in its inverted position.

The bottle 7 is surrounded by an insulation as shown, in the form of a vacuum jacket. This vacuum jacket may comprise segmental hollow glass walls 8 and a hollow glass cover or top 9. The vacuum jacket is supported from the top of the receptacle 1 and is spaced apart, at its sides and top, from the bottle 7. To prevent lateral sliding movement of the jacket on the receptacle 1, its bottom rests in an annular seat 10 formed in the outer marginal edge of the top of the receptacle 1. The central portion of the cover 9 extends within the walls of the jacket to hold the same in position. Interposed between the bottom of the walls 8 and receptacle 1 and the top of said walls and the cover 9 are pliable packings 11 and 12, respectively, of rubber or other suitable material, to afford air-tight joints.

The side walls 8 of the jacket are held assembled by a skeleton metallic frame comprising channel standards 13 tied together at the upper and lower ends of their outer flanges by segmental bars 14. As best shown in Fig. 3, the vertical edges of the segmental walls 8 are detachably and removably seated in the channel standards 13. It will also be noted that the webs of the channel standards 13, connecting adjacent edges of the walls 8, are placed in flat engagement, one with the other, and soldered, or otherwise rigidly secured, together.

The jacket may be readily removed from the receptacle 1 for the purpose of substituting a filled bottle for an empty one; then placed around the filled bottle, for the purpose of keeping the contents Z thereof at a given temperature. The bottle and its contents are clearly visible when the vacuum jacket is made transparent, but it will be understood that the jacket may be opaque when desired within the spirit of my invention.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. A vacuum jacket including wall sections, channel standards, arranged to telescopically receive the vertical edges of said wall sections, and tie bars permanently connecting said standards for holding said wall sections removably assembled.

2. A vacuum jacket including wall sections, channel standards, arranged to telescopically receive the vertical edges of said wall sections, and tie bars embracing said wall sections and permanently connecting said standards at their upper and lower ends for holding said wall sections removably assembled.

3. A vacuum jacket including wall sections, channel standards, arranged to telescopically receive the vertical edges of said wall sections, tie bars permanently connecting said standards for holding said wall sections removably assembled, and a removable cover having a seat for receiving the upper edges of said wall sections.

4. A vacuum jacket including wall sections, channel standards arranged to telescopically receive the vertical edges of said wall sections, tie bars embracing said wall sections, permanently connecting said standards at their upper and lower ends for holding said wall sections removably assembled, and a cover having a seat for receiving the upper edges of said wall sections.

In testimony whereof I have signed my name to this specification in the presence of a subscribing witness.

EDWARD T. WARDELL.

Witness:
F. G. BRADBURY.

Copies of this patent may be obtained for five cents each, by addressing the "Commissioner of Patents, Washington, D. C."